United States Patent
Ehrmann

(10) Patent No.: US 6,176,319 B1
(45) Date of Patent: Jan. 23, 2001

(54) EQUINE POWER PICK

(76) Inventor: Douglas G. Ehrmann, 75 Beverly Hill Rd., Clifton, NJ (US) 07012

( * ) Notice: Under 35 U.S.C. 154(b), the term of this patent shall be extended for 0 days.

(21) Appl. No.: 09/255,264

(22) Filed: Feb. 23, 1999

(51) Int. Cl.[7] .................................................. A01L 15/00
(52) U.S. Cl. ........................................................ 168/48.1
(58) Field of Search .................................... 168/48.1, 45

(56) References Cited

U.S. PATENT DOCUMENTS

| | | | | |
|---|---|---|---|---|
| 274,570 | * | 3/1883 | Davis | 168/48.1 |
| 544,540 | * | 8/1895 | Jones | 168/48.1 |
| 1,170,950 | * | 2/1916 | Ambicky | 168/48.1 |
| 4,367,798 | * | 1/1983 | Sabol | 168/48.1 |
| 5,168,935 | * | 12/1992 | Thornbury et al. | 168/48.1 |
| 5,176,222 | * | 1/1993 | Tippin | 168/48.1 |
| 5,636,697 | * | 6/1997 | Pitchford | 168/48.1 |
| 5,960,745 | * | 10/1999 | Boyland | 119/613 |

* cited by examiner

*Primary Examiner*—Thomas Price
(74) *Attorney, Agent, or Firm*—James F. Cottone

(57) ABSTRACT

A hand-held hoof cleaning tool is formed as a shaped handle and a simply bent metal pick element, which are specially oriented and configured to greatly improve the amount of controllable power that may be applied to the cleaning task. In a preferred embodiment, a specially shaped handle guides the user's grasp to ensure that a somewhat narrow range of picking angles are employed by the bent metal pick tip. Acute picking angles within the range of 15 to 35 degrees are described, which allow highly controllable and effective leveraged cleaning action to be accomplished while reducing the need of large wrist twisting motions.

10 Claims, 1 Drawing Sheet

EQUINE POWER PICK

TECHNICAL FIELD

The present invention relates generally to tools for cleaning horses' hooves, and more Particularly to a specially configured hand-held pick for forcefully removing debris from horses' hooves employing a handle/cleaning point arrangement that permits improved application of control and power to the cleaning element.

BACKGROUND

For centuries, hand held tools of various types have been used to clean accumulated debris from horses' hooves, and it is well known and commonly accepted to be a task requiring a good deal of user strength and effort. The benefits of regular cleaning of hooves of the equine species—including horses, mules, and the like—are so manifest that the task of cleaning is carried out almost daily without exception. Even so, comparatively little has changed over the years regarding tools and cleaning techniques, and the well-known handle/sharpened-tip tools remain the standard of the craft. Variously shaped cleaning points or picks have been described, and occasionally stiff-bristle brushes have been incorporated into combination-type cleaning tools. Virtually all hoof cleaning tools require a hefty amount of wrist-straining effort to pry out hard-packed material such as mud, manure, straw, ice, and other encrusted debris. While adequate results are generally achieved using the basic pick-type tools, damage to horses' hooves and users' hands is not uncommon.

Descriptions of typical prior art approaches to hand-held tools for cleaning the hooves of horses and methods of their use may be found in a number of U.S. patents.

U.S. Pat. No. 4,367,798 to Sabol discloses a typical contemporary hoof cleaning tool having a conically shaped hook and a trapezoidally shaped scraper disposed in a head end of a contoured handle. A stiff cleaning brush is affixed to the other handle end. The hook and scraper are on opposite sides of the tool head end and the hook is disposed at a 90-degree angle to the longitudinal axis of the handle body.

U.S. Pat. No. 5,636,697 to Pitchford also discloses a hand-held tool for cleaning horses' hooves, and again shows a pick member integrally formed at one end of a handle with the pick disposed at 90 degrees to the longitudinal axis of the handle. In use, the handle is manipulated back and forth with the debris being removed largely via the conventional backstroke pulling motion.

U.S. Pat. No. 5,575,337 to Sapyta discloses a recent (1966) hoof pick having a T-shaped handle that drives an elongated shank with a wedge-shaped tip. A curved hook may also be welded to the shank, and in use the wedge and hook portions are used sequentially by inverting (or flipping over) the handle in the user's hand to bring either tool surface to bear on the debris.

A very early (1896) U.S. Pat. No. 567,493 to MeCartae, discloses a multi-purpose farrier's tool, and not only includes a cleaning pick but also includes a number of auxiliary elements, some of which fold into or swing out at right angles from a handle to produce a multi-function device.

Additional teachings of various types of prior art, hand-held hoof cleaning tools are found in U.S. Pat. No. 5,168,935 to Thornbury et al., as well as in the 1997 Design U.S. Pat. No. D381,474 to Dalton, and the 1983 Design U.S. Pat. No. D270,104 to Jensen.

While each of these prior art cleaning picks function more or less well, they have not to date addressed the basic problem of far-from-optimum orientation of their various elements in order to mitigate the wrist-straining efforts required for their use. It is exactly this need that the present invention admirably meets with its specially configured handle/pick arm arrangement, which greatly enhances the control and power a user can apply via the tool.

OBJECTS OF THE INVENTION

It is therefore a primary object of the present invention to provide an improved hand-held pick for cleaning the debris from the hooves of horses and others of the equine species.

A further object of the present invention is to provide a hand-held pick specially configured to allow increased leverage to be applied during either the pushing or pulling action of the user's hand and arm.

A still further object of the present invention is to provide improved relative orientation of the handle and cleaning pick elements of a hoof cleaning tool that permits its use without the necessity for major wrist bending by the user.

A yet further object of the present invention is to provide an improved hoof cleaning pick wherein the pick element itself is oriented at an angle between 15 and 35 degrees to a vertical handle axis while being held such that the user's forearm remains substantially orthogonal to the handle axis.

In a preferred embodiment, a hand-held pick tool consisting of a shaped handle and a simply bent metal pick element is specially configured such that the handle is preferably held in a substantially upright orientation during use, which causes the pick element at its lower end to be oriented at an acute angle to the handle's vertical axis. The handle is shaped to encourage proper gripping and usage, namely with the user's forearm positioned orthogonally to the handle's axis and the user's wrist in an untwisted state. In use, the lower end of the pick terminates just short of the extended longitudinal handle axis, all of which greatly improves the control of and power level that may be applied to the pick, thereby significantly improving its cleaning action.

BRIEF DESCRIPTION OF THE DRAWINGS

Additional objects and advantages of the invention will become apparent to those skilled in the art as the description proceeds with reference to the accompanying drawings, wherein.

BEST MODE FOR CARRYING OUT THE INVENTION

Figures 1, 2, 3, 4:
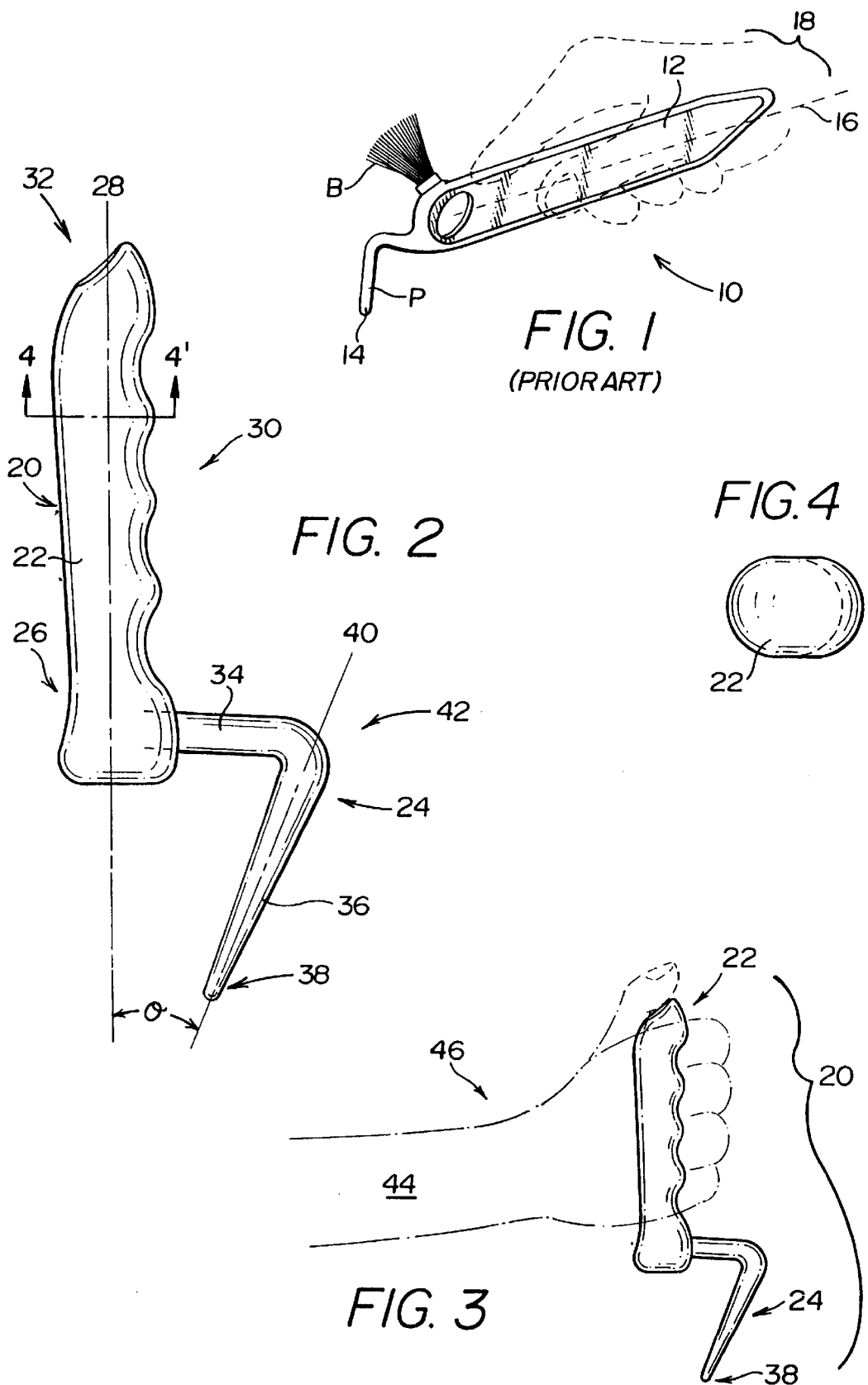
FIG. 1 shows a typical prior art horse hoof cleaning tool illustrating the conventional 90-degree orientation between the pick working element and the longitudinal axis of its associated handle.
FIG. 2 is a side view of an improved equine power pick according to the present invention.
FIG. 3 is a side view of the equine power pick shown in use whereby the particularly angled position of the pick's working element allows both improved control and the application of increased power for cleaning.
FIG. 4 is a cross-sectional view taken along the lines 4–4' of FIG. 3.

Referring briefly to FIG. 1, there is shown a perspective view of a typical prior art combined tool for cleaning horses' hooves by vigorously picking out debris and brushing off hoof surfaces. The pick 10 includes an elongated flat handle 12 with a pick element P at its working end and may optionally include a stiff brush element B oppositely disposed to the pick P. In particular, note the angle between the orientation of a primary axis 14 of the pick element P and a longitudinal axis 16 of the handle 12. For virtually all prior art hoof cleaning picks, this angle is very close to 90 degrees and historically has apparently remained unchanged. In use, the pick 10 is grasped by the user as depicted by a hand (shown in phantom) such that the user's wrist 18 is forced to assume a highly twisted position. Cleaning action via such hand-held tools has been adequate, as detailed in the several U.S. patents described in the Background section of the present specification, and has always required a considerable amount of "elbow grease" by the user.

Referring now to FIG. 2, there is shown a side view of a horse hoof cleaning pick according to the present invention. A hand-held pick 20 includes a shaped handle 22, which carries a specially configured metal arm 24, rigidly affixed to or embedded in a lower handle end 26. The handle 22 may be made of any suitably strong material, such as wood, plastics, or metal, and has a longitudinal axis 28, a shaped finger hold portion 30, and a shaped thumb hold portion 32. The metal arm 24 includes a first portion 34 arranged to emerge from the lower handle end 26 at substantially a right handle, and a second portion 36, which is formed so as to be bent backward toward the handle 28. The arm portion 36 has a rounded tip working portion 38 and a longitudinal arm axis 40. Advantageously, the arm portion 36 is swept back about a bend region 42 to form an acute picking angle θ between the handle axis 28 and the arm axis 40, with the ideal range for e being between 15 degrees and 35 degrees. In a preferred embodiment, 23 degrees has been found to be a highly effective picking angle, and the metal arm 24 is formed of forged steel, which is embedded into and securely retained in a molded high-impact plastic handle 22. handle 22 may include shaped elements such as bends and protrusions (not shown) to ensure a stronger grip on the arm 24 in the well-known rebar-like arrangement. Alternately, the handle 22 and the arm 24 may be integrally formed as a one-piece device.

Referring now to FIG. 3, in addition to FIG. 2, the power pick 20 is shown in a preferred manner of usage by being held such that a user's forearm 44 (in phantom) is oriented at substantially a right angle to the axis 28 of the handle 22 for optimum application of power to the pick tip 38. The ideal upright position of the pick 20 is readily achieved by virtue of the finger and thumb portions 32 and 30, which are formed so as to guide the user's fingers and hand into assuming the proper hand grip position. Note that when so grasped, the user's wrist 46 is substantially unbent, as contracted with the user's wrist in FIG. 1 holding prior art picks, thus significantly improving both the fine angle control and articulation of the arm 24, as well as allowing greater arm power and leverage to be transferred to the tip 38.

These operational factors—control, power, and leverage—combine to produce remarkable improvements in cleaning performance by supporting a range of previously unavailable pick manipulating techniques. For example, when the pick point is used to clean out hoof clefts, with the point placed in the cleft pushing forward causes the bend region 42 to encounter the horseshoe or sole, allowing leverage to be applied, thereby readily popping out heavy debris packed into the cleft. Additionally, the user's arm/wrist orientation combined with the upright orientation of the handle 22 and the resulting picking angle θ of about 23 degrees allows cleaning of various hoof portions to be done equally forcefully by either a pushing or pulling action. By virtue of all of these ideal orientations, leverage can be applied to variously angled surfaces and niches while keeping the wrist largely unbent. This action is in direct contrast to prior art cleaning devices and techniques where jabbing or stabbing cleaning actions are inherently involved and typically favor a pick pushing or pulling action but not both. Needless to say, difficult-to-control jabbing or stabbing motions can lead to unwanted injury to both horse and user. No such limitations or liabilities are forced by the structures of the present invention, and indeed optimum leverage, power, and control may be applied equally via both pushing and pulling movements, as well as via the use of moderate leveraging angles.

Brief reference to FIG. 4 shows a cross-sectional view of a preferred embodiment of the handle 22. While the handle 22 may be considered as generally an elongated cylinder, cross sections of other than strictly circular ones are contemplated, with an ellipse of low eccentricity (nearly circular) shown as an illustrative alternative. The dashed lines depict the finger guiding indentations, all of which contribute to the improved controllability of the power pick 20.

Although the invention has been described in terms of a preferred embodiment and in particular an optimum range of picking angles, the invention should not be deemed limited thereto since other embodiments and modifications—such as flat handles or handles of elliptical cross section but of high eccentricity—will readily occur to one skilled in the art. It is therefore to be understood that the appended claims are intended to cover all such modifications as fall within the true spirit and scope of the invention.

What is claimed is:

1. A hand-held tool for cleaning debris from horses' hooves comprising:
   (a) a shaped elongated handle having a longitudinal axis centrally disposed therein, including retention means at a lower handle end for rigidly retaining or carrying a working element;
   (b) an elongated arm working element having an arm retention end and an arm working end with a bend at a first acute included angle formed in a middle region there between;
   (c) said arm retention end rigidly retained in or carried by said retention means such that said arm retention end and said handle longitudinal axis are nominally orthogonal with said arm working end extending below said handle lower end;
   (d) said first acute included bend angle causing said arm working end to point toward said longitudinal axis, thereby forming a second complementary acute angle with said longitudinal axis; and
   (e) whereby in use said longitudinal axis may be maintained in a substantially vertical orientation and a tip of said arm working end may be applied to said hooves at said second acute angle.

2. The hand-held hoof cleaning tool of claim 1 wherein said elongated arm is formed of metal and said handle is substantially cylindrically shaped and formed of wood or plastic.

3. The hand-held hoof cleaning tool of claim 2 wherein said handle further includes indentations along at least one of its outer surface portions to engage and guide a user's grasp, thereby orienting said longitudinal access to be substantially vertical in use.

4. The hand-held hoof cleaning tool of claim 3 wherein said indentations are formed along an upper surface of said handle to engage and guide a user's thumb and along an outer longitudinally oriented surface portion of said handle to engage and guide a user's fingers.

5. The hand-held hoof cleaning tool of claim 1 wherein said handle is generally cylindrically shaped and said retention means is an opening in said handle lower end adapted to securely received said arm retention end.

6. The hand-held hoof cleaning tool of claim 1 wherein said second acute angle is in the range of between 15 and 35 degrees.

7. The hand-held hoof cleaning tool of claim 6 wherein said second acute angle is between 20 and 25 degrees.

8. The hand-held hoof cleaning tool of claim 1 wherein said retention means and said arm retention end are integrally formed in one piece, and said handle and arm working element comprise a single material chosen from the group including wood, plastic, and metal.

9. The hand-held hoof cleaning tool of claim 1 wherein said handle is generally elliptical in cross section.

10. A hand-held tool for cleaning debris from horses' hooves comprising:
   (a) a cylindrically shaped elongated handle having a longitudinal axis centrally disposed therein, including retention means at a lower handle end for rigidly retaining or carrying a working element;
   (b) said handle further including indentations along at least one of its outer surface portions to guide and orient a user's grasp;
   (c) an elongated metal arm working element having an arm retention end and an arm working end with a bend at a first acute included angle formed in a middle region there between;
   (d) said arm retention end rigidly retained in or carried by said retention means such that said arm retention end and said handle longitudinal axis are nominally orthogonal with said arm working end extending below said handle lower end;
   (e) said first acute included bend angle causing said arm working end to point toward said longitudinal axis, thereby forming a second complementary acute angle with said longitudinal axis; and
   (f) whereby in use said longitudinal axis may be maintained in a substantially vertical orientation by means of said indentations and a tip of said arm working end may be applied to said hooves at said second acute angle.

* * * * *